G. A. OSTERUD.
GARDEN RAKE FORK.
APPLICATION FILED MAR. 7, 1912.
1,046,849.
Patented Dec. 10, 1912.
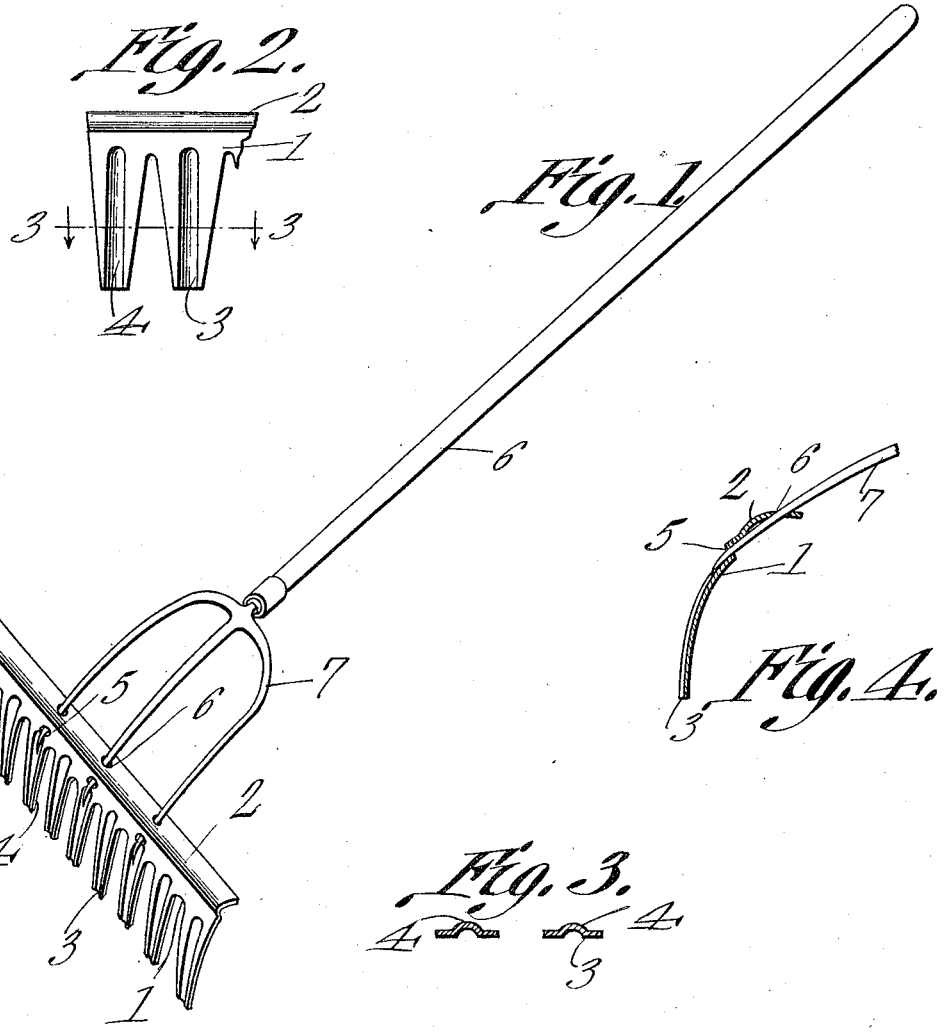
Gustav A. Osterud,
Inventor

UNITED STATES PATENT OFFICE.

GUSTAV A. OSTERUD, OF OSTRANDER, MINNESOTA.

GARDEN-RAKE FORK.

1,046,849. Specification of Letters Patent. Patented Dec. 10, 1912.

Application filed March 7, 1912. Serial No. 682,114.

*To all whom it may concern:*

Be it known that I, GUSTAV A. OSTERUD, a citizen of the United States, residing at Ostrander, in the county of Fillmore and State of Minnesota, have invented a new and useful Garden-Rake Fork, of which the following is a specification.

It is the object of the present invention to provide an attachment for a pitch fork, whereby the pitch fork may be converted into a rake handle, the attachment constituting the body or toothed portion of the rake.

A further object of the invention is to provide a rake body for attachment to a pitch fork, the teeth of the body being provided with longitudinally disposed, reinforcing corrugations, strengthening the teeth, and constituting sockets, adapted to receive the tines of the fork, the rake body being provided with a trough-shaped bead, in which bead, and in the main portion of the body, there are openings, alined with the corrugations, and adapted to receive the tines of the fork.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in perspective, assembled with a pitch fork; Fig. 2 is a fragmental front elevation of the body portion of the device; Fig. 3 is a section upon the line 3—3 of Fig. 2; and Fig. 4 is a transverse section of the rake body, the cutting plane passing through the teeth, one of the tines of the fork being shown in place in the body.

The rake body herein disclosed is preferably fashioned from sheet metal, and comprises a plate 1, provided along its rear edge with a trough-shaped bead 2. Projecting from the forward edge of the plate 1 are the teeth 3 of the rake, the teeth 3 and the plate 1 being of curved form, as shown clearly in Fig. 4. Each of the teeth 3 is equipped with a longitudinally extended reinforcing corrugation 4, terminated adjacent the plate 1. In the plate portion 1 of the body and alined with certain of the corrugations 4 are primary openings 5, there being secondary openings 6 in the free edge of the bead portion 2 of the body, the secondary openings 6 being alined with the primary openings 5, and being alined also with certain of the corrugations 4. The pitch fork, shown in Fig. 1, comprises the usual handle 6, from which project the tines 7.

In practical operation, the tines 7 are thrust through the secondary openings 6 in the bead 2, the tines 7 then passing through the primary openings 5 in the plate portion 1 of the body, the extremities of the tines 7 resting in the corrugations 4, as shown to best advantage in Fig. 4. The corrugations 4 serve, at once, as means for reinforcing the teeth 3, and as sockets, adapted to receive the free ends of the tines 7.

When the device is in operation, the raking action will tend to seat the rake body firmly upon the tines 7 of the fork. The tines 7 have a three-point bearing upon the rake body, the tines engaging the edges of the secondary openings 6, and also the edges of the primary openings 5, the extremities of the tines bearing against the teeth 3, within the reinforcing corrugations 4. It is to be noted that the points of the tines 7 lie within the contour of the corrugations 4, and thus the points of the tines are protected, it being impossible for the tines to do injury to a person carelessly handling the body end of the structure.

The foregoing is of particular importance when it is recalled that it is common to remove accumulated material, manually, from the teeth 3 of the rake body.

Having thus described the invention, what is claimed is:—

1. An attachment for a pitch fork, comprising a body provided with a trough-shaped bead along one edge, and with teeth projecting from its opposite edge, the teeth having longitudinal reinforcing corrugations, the corrugations being open throughout their entire length, there being a primary opening in the body, alined with the corrugations, the free edge of the bead being provided with secondary openings alined with the primary openings and with the corrugations, the corrugations serving to receive and shield the tines of the fork wherewith the device is assembled.

2. An attachment for a pitch fork, comprising a body provided with a trough-shaped bead along one edge, and with reinforcing corrugations located at right angles to the bead, the corrugations being open throughout their entire length, there being primary openings in the body, alined with the corrugations and the bead being provided with secondary openings, alined with the primary openings and with the corrugations.

3. An attachment for a pitch fork, comprising a body provided along its rear edge with a trough-shaped bead, there being primary openings in the body, and the bead being provided with secondary openings, alined with the primary openings.

In testimony that I claim the foregoing as my own, I have hereto affixed my signature in the presence of two witnesses.

GUSTAV A. OSTERUD.

Witnesses:
H. O. LARSON,
LELA M. LARSON.

---

Copies of this patent may be obtained for five cents each, by addressing the "Commissioner of Patents, Washington, D. C."